US011840800B2

(12) United States Patent
O'Brien et al.

(10) Patent No.: US 11,840,800 B2
(45) Date of Patent: Dec. 12, 2023

(54) HIGH STRENGTH POLYVINYLIDENE FLUORIDE BASED SIZED REINFORCING FIBERS

(71) Applicant: Arkema Inc., King of Prussia, PA (US)

(72) Inventors: Gregory Scott O'Brien, Downingtown, PA (US); Ramin Amin-Sanayei, Malvern, PA (US); Saeid Zerafati, Villanova, PA (US); James T. Goldbach, Paoli, PA (US)

(73) Assignee: Arkema Inc., King of Prussia, PA (US)

( * ) Notice: Subject to any disclaimer, the term of this patent is extended or adjusted under 35 U.S.C. 154(b) by 0 days.

(21) Appl. No.: 16/630,610

(22) PCT Filed: Jul. 16, 2018

(86) PCT No.: PCT/US2018/042237
§ 371 (c)(1),
(2) Date: Jan. 13, 2020

(87) PCT Pub. No.: WO2019/014662
PCT Pub. Date: Jan. 17, 2019

(65) Prior Publication Data
US 2020/0157735 A1    May 21, 2020

Related U.S. Application Data

(60) Provisional application No. 62/655,481, filed on Apr. 10, 2018, provisional application No. 62/532,554, filed on Jul. 14, 2017.

(51) Int. Cl.
| *D06M 15/256* | (2006.01) |
| *C08F 214/22* | (2006.01) |
| *C08F 220/06* | (2006.01) |
| *C08F 220/18* | (2006.01) |
| *D06M 15/263* | (2006.01) |
| *C08F 214/28* | (2006.01) |
| *C08K 7/06* | (2006.01) |
| *C08K 7/14* | (2006.01) |
| *C08K 9/08* | (2006.01) |
| *C08L 27/16* | (2006.01) |
| *D06M 101/40* | (2006.01) |
| *C08F 2/38* | (2006.01) |

(52) U.S. Cl.
CPC ......... *D06M 15/256* (2013.01); *C08F 214/22* (2013.01); *C08F 214/28* (2013.01); *C08F 220/06* (2013.01); *C08F 220/18* (2013.01); *C08K 7/06* (2013.01); *C08K 7/14* (2013.01); *C08K 9/08* (2013.01); *C08L 27/16* (2013.01); *D06M 15/263* (2013.01); *C08F 2/38* (2013.01); *C08K 2201/016* (2013.01); *C08L 2205/035* (2013.01); *D06M 2101/40* (2013.01)

(58) Field of Classification Search
CPC combination set(s) only.
See application file for complete search history.

(56) References Cited

U.S. PATENT DOCUMENTS

| 2,968,649 | A | | 1/1961 | Pailthorp et al. | |
| 3,886,108 | A | * | 5/1975 | Snow, Jr. | C08J 3/07 523/335 |
| 4,071,495 | A | * | 1/1978 | Stark | C08K 7/14 524/492 |
| 4,749,610 | A | * | 6/1988 | Katsuragawa | C08F 259/08 428/421 |
| 4,863,794 | A | * | 9/1989 | Fujii | B05D 5/083 428/325 |
| 6,183,676 | B1 | | 2/2001 | Gonthier | |
| 6,586,547 | B1 | | 7/2003 | Amin-Sanayei et al. | |
| 10,533,109 | B2 | | 1/2020 | Zheng et al. | |
| 2004/0025262 | A1 | * | 2/2004 | Hamers | C11D 3/0036 8/115.51 |
| 2005/0062023 | A1 | * | 3/2005 | Korzhenko | C09D 127/16 252/511 |
| 2010/0215948 | A1 | | 8/2010 | Kissounko et al. | |
| 2010/0255378 | A1 | | 10/2010 | Bonnet et al. | |
| 2011/0000617 | A1 | * | 1/2011 | Booze | D21H 13/50 156/311 |
| 2011/0166278 | A1 | * | 7/2011 | Hochstetter | D06M 15/256 524/404 |

(Continued)

FOREIGN PATENT DOCUMENTS

| EP | 1229091 A2 * | 8/2002 | C08L 27/12 |
| GB | 827308 | 2/1960 | |
| GB | 1102026 A * | 2/1968 | D06M 15/277 |
| KR | 20110055668 A * | 5/2011 | D06N 3/047 |
| WO | WO-2008129041 A1 * | 10/2008 | B01D 69/02 |
| WO | WO-2013110740 A1 * | 8/2013 | H01G 11/38 |
| WO | WO-2016003748 A1 * | 1/2016 | C09D 7/65 |
| WO | WO-2016149238 A1 * | 9/2016 | C08F 114/22 |
| WO | WO-2017087484 A1 * | 5/2017 | D04H 1/64 |

OTHER PUBLICATIONS

Tran, M Q et al; Carbon Fibre Reinforced Poly(Vinylidene Fluoride): Impact of Matrix Modification on Fibre/Polymer Adhesion; Composites Science and Technology; vol. 68, No. 7-8; Jun. 1, 2008; pp. 1766-1776.

(Continued)

Primary Examiner — Nicole M. Buie-Hatcher
(74) Attorney, Agent, or Firm — Joanne Rossi

(57) ABSTRACT

The invention relates to sized reinforcing fibers that comprise a reinforcing fiber sized with a fluoropolymer. The fluoropolymer is functionalized and/or the reinforcing fiber is sized with a compatible functional non-fluorinated polymer that is compatible with the fluoropolymer. Functionalization of the fluoropolymer or the compatible non-fluorinated polymer provides enhanced properties, such as increased adhesion to the reinforcing fiber.

19 Claims, No Drawings

(56) References Cited

U.S. PATENT DOCUMENTS

| | | |
|---|---|---|
| 2012/0261182 A1* | 10/2012 | Megaridis .............. C08L 27/16 |
| | | 174/388 |
| 2014/0154611 A1 | 6/2014 | Ameduri et al. |
| 2017/0056924 A1 | 3/2017 | Takenaka et al. |
| 2018/0072829 A1 | 3/2018 | Amin-Sanayei et al. |
| 2020/0048805 A1 | 2/2020 | Henry et al. |

OTHER PUBLICATIONS

Zhao, J et al; A Comparative Study of Fibre/Matrix Interface in Glass Fibre Reinforced Polyvinylidene Fluoride Composites; Colloids and Surfaces A: Physochemical and Engineering Aspects; vol. 413; Feb. 24, 2012; pp. 58-64.

* cited by examiner

HIGH STRENGTH POLYVINYLIDENE FLUORIDE BASED SIZED REINFORCING FIBERS

CROSS-REFERENCE TO RELATED APPLICATIONS

This application is a national stage application under 35 U.S.C. § 371 of PCT/US2018/042237 filed Jul. 16, 2018, which claims the benefit of U.S. Provisional Patent Application No. 62/655,481, filed Apr. 10, 2018 and No. 62/532,554, filed Jul. 14, 2017.

TECHNICAL FIELD

Embodiments herein are directed to sized reinforcing fibers such as carbon fibers, aramid fibers, and glass fibers. The sized reinforcing fibers comprise a reinforcing fiber sized with at least one of a functionalized fluoropolymer or both a fluoropolymer and a compatible functional non-fluorinated polymer. The functionalization of the functionalized fluoropolymer or the compatible functional non-fluorinated polymer imparts greater adhesion to the reinforcing fiber to improve mechanical performance and chemical resistance.

BACKGROUND

Reinforcing fibers such as carbon fibers, aramid fibers, and glass fibers have high strength and are often used to reinforce thermoplastic polymers. Fluoropolymers such as polyvinylidene fluoride and polyvinylidene copolymers have low surface tension, which makes it difficult to produce high strength reinforced compounds or thermoplastic composites. To efficiently reinforce these fluoropolymers with fibers, there should be good adhesion at the interface of the fiber and the sizing. In addition, the sizing needs to chemically bound to or be compatible with matrix resin in order to properly transfer stress from the matrix to the reinforcement. In addition, the chemical resistance of a composite or compound is limited by the chemical resistance of the sizing of the reinforcing fibers which adheres the polymer matrix to the reinforcing fiber.

We have surprisingly found that it is possible to produce higher strength and more chemically resistant reinforced compounds and thermoplastic composites by sizing a reinforcing fiber with a fluoropolymer such as an acid or anhydride functionalized PVDF described below, but one could extend this to other functional groups. It now also been found that sizing a reinforcing fiber with a functionalized PVDF described below will lead to a more a higher strength and yield a thermoplastic composite with more chemical resistance, size most sizing do not have the chemically resistance of a fluoropolymer and can degrade in harsh environments.

SUMMARY

Embodiments herein are directed to sized reinforcing fibers, composite materials including the sized reinforcing fibers, and methods of making the sized reinforcing fibers and composite materials.

A series of embodiments of the invention are discussed below:

Embodiment 1

A sized reinforcing fiber comprising:
a) a reinforcing fiber comprising materials from the group consisting of carbon fiber, aramid fiber, and glass fiber; and
b) at least one sizing selected from the group consisting of:
  i. a functionalized vinylidene fluoride polymer (PVDF), wherein the functionalized PVDF is a polyvinylidene polymer or copolymer containing a low molecular weight functional polymer chain transfer agent (wherein at least one functional group of the functionalized PVDF is adhered to the reinforcing fiber) or
  ii. both a fluoropolymer and a fluoropolymer compatible functional non-fluorinated polymer, wherein at least one functional group of the compatible functional non-fluorinated polymer is adhered to the reinforcing fiber, or
  iii. a functional PVDF copolymer comprising VDF monomer, optional fluorinated comonomer, and a functional comonomer such as acrylic acid, methacrylic acid, maleic anhydride, etc., wherein at least one functional group of the polymer is adhered to the reinforcing fiber.

Embodiment 2

The sized reinforcing fiber of embodiment 1, wherein the sizing includes the functionalized PVDF and wherein the functionalized PVDF contains polyvinylidene fluoride polymer or copolymer and a low molecular weight functional polymer chain transfer agent.

Embodiment 3

The sized reinforcing fiber of any of embodiments 1 or 2, wherein the low molecular weight functional polymer chain transfer agent is of the formula: $-(CH_2-CH_2)_y-X-R$, wherein y is an integer from 2 to 1000; X is a linking group selected from the group consisting of a covalent bond, an ionic bond, an alkyl, an alkene, an alkyne, a substituted alkyl, a substituted alkene, an aryl, an ester, an ether, a ketone, an amine, an amide, and an organo-silane; and R is a functional group.

Embodiment 4

The sized reinforcing fiber of any of embodiments 1 to 3, wherein the sizing includes both the fluoropolymer and the compatible functional non-fluorinated polymer and wherein the compatible functional non-fluorinated polymer is a functional acrylic copolymer including at least one acid containing monomer such as methacrylic acid or acrylic acid and at least one methyl methacrylate monomer. In addition, the acid groups in the acrylic can be converted to anhydride groups to offer a different type of functionality.

Embodiment 5

A sized reinforcing fiber comprising:
a) a reinforcing fiber selected from the group consisting of carbon fiber, aramid fiber, and glass fiber;
b) a first sizing polymer containing at least one functional group; and
c) at least one further sizing selected from the group consisting of:
  i. a functionalized vinylidene fluoride polymer (PVDF), wherein the functionalized PVDF is a polyvinylidene polymer or copolymer containing a low molecular weight functional polymer chain transfer agent wherein at least one functional group of the functionalized PVDF is adhered or bonded to the first sizing polymer, or ii. both a fluoropolymer and a fluoropolymer compatible functional non-fluorinated polymer, wherein at least one functional group of the compatible functional non-fluorinated polymer is adhered or bonded to the first sizing polymer.

iii. a functional PVDF copolymer comprising VDF monomer, optional fluorinated comonomer, and a hydrogen containing functional comonomer such as acrylic acid, methacrylic acid, maleic anhydride, etc., wherein at least one functional group of the polymer is adhered or bonded to the first sizing polymer.

Embodiment 6

The sized reinforcing fiber of embodiment 5, wherein the reinforcing fiber is carbon fiber and the first polymer is compatible with the carbon fiber.

Embodiment 7

The sized reinforcing fiber of any of embodiments 5 or 6, wherein the sizing includes the functionalized PVDF and wherein the functionalized PVDF contains polyvinylidene fluoride and a low molecular weight functional polymer chain transfer agent.

Embodiment 8

The sized reinforcing fiber of embodiment 7, wherein the low molecular weight functional polymer chain transfer agent is of the formula: $-(CH_2-CH_2)_y-X-R$,
wherein y is an integer from 2 to 1000; X is a linking group selected from the group consisting of a covalent bond, an ionic bond, an alkyl, an alkene, an alkyne, a substituted alkyl, a substituted alkene, an aryl, an ester, an ether, a ketone, an amine, an amide, and an organo-silane; and R is a functional group.

Embodiment 9

The sized reinforcing fiber of any of embodiments 5 to 8, wherein the sizing includes both the fluoropolymer and the fluoropolymer compatible functional non-fluorinated polymer and wherein the compatible functional non-fluorinated polymer is a functional acrylic copolymer including at least one acid containing monomer such as methacrylic acid or acrylic acid and at least one methyl methacrylate monomer.

Embodiment 10

A method of preparing sized carbon fiber comprising
1) activating a carbon fiber to form oxygen containing functional groups through high temperature oxidizing treatment or oxidizing acid treatment or other chemical treatment to functionalize the carbon fiber; and
2) sizing the carbon fiber with a functionalized PVDF containing at least one functional group; (See embodiments 1-9)
wherein the at least one functional group of the functionalized PVDF adhering or bonding the functional PVDF to the carbon fiber.

Embodiment 11

A method of preparing sized reinforcing fiber comprising sizing a reinforcing fiber sized with a first polymer containing at least one functional group, and then adding a functionalized PVDF containing at least one functional group, wherein the at least one functionalized group on the functionalized PVDF forms a bond with the at least one functional group of the first polymer. It is also a possibility to size the fibers with both polymers at the same time Embodiment 12

The method of embodiment 11, wherein the first polymer is compatible with the reinforcing fiber.

Embodiment 13

The method of any of embodiments 11 and 12, further comprising sizing the reinforcing fiber with the first polymer prior to sizing with the functionalized PVDF.

Embodiment 14

The sized reinforcing fiber of any of embodiments 1-5 or 7-9, wherein the reinforcing fiber is carbon fiber. Do we have all the right claims in this list?

Embodiment 15

The sized reinforcing fiber of any of embodiments 1-5 or 7-9, wherein the reinforcing fiber is aramid fiber.

Embodiment 16

The sized reinforcing fiber of any of embodiments 1-5 or 7-9, wherein the reinforcing fiber is glass fiber.

Embodiment 17

A method of preparing sized glass fiber comprising sizing the glass fiber with a functionalized PVDF containing at least one functional group; wherein the glass fiber contains at least one silane bonded to at least one silane coupling agent and wherein the at least one functional group reacts with the at least one silane coupling agent.

Embodiment 18

The sized reinforcing fiber of any of embodiments 1 to 17, wherein the at least one sizing includes both the fluoropolymer and the fluoropolymer compatible functional non-fluorinated polymer, wherein the compatible functional non-fluorinated polymer includes at least one monomer selected from the group consisting of $\alpha,\beta$ unsaturated carboxylic acids, an acrylic monomer containing a hydroxyl group, a monomer containing an epoxy group, a monomer containing silanols, a monomer containing an aldehyde, an alkenyl cyanide, and acetoacetoxyethyl methacrylate.

Embodiment 19

The sized reinforcing fiber of any of embodiments 1 to 18, wherein the at least one sizing includes both the fluoropolymer and the fluoropolymer compatible functional non-fluorinated polymer, wherein the compatible functional non-fluorinated polymer includes at least one monomer selected from the group consisting of acrylic acid, methacrylic acid, fumaric acid, crotonic acid, itaconic acid, hydroxyethyl methacrylate, hydroxyethyl acrylate, hydroxypropyl acrylate, hydroxypropyl methacrylate, diethylene glycol ethyl ether acrylate, glycidyl acrylate, glycidyl methacrylate, γ-trimethoxysilane methacrylate, γ-triethoxysilane methacrylate, acrolein, acrylonitrile, methacrylonitrile, and acetoacetoxyethyl methacrylate.

Embodiment 20

The sized reinforcing fiber of embodiments 1-19, wherein the fluoropolymer compatible functional non-fluorinated polymer includes at least one monomer selected from the group consisting of acrylic acid, methacrylic acid, itaconic acid, and methyl methacrylate.

Embodiment 21

The sized reinforcing fiber of embodiment 5, wherein the at least one further sizing includes both the fluoropolymer and the fluoropolymer compatible functional non-fluorinated polymer, wherein the compatible functional non-fluorinated polymer includes at least one monomer selected from the group consisting of α,β unsaturated carboxylic acids, an acrylic monomer containing a hydroxyl group, a monomer containing an epoxy group, a monomer containing silanols, a monomer containing an aldehyde, an alkenyl cyanide, and acetoacetoxyethyl methacrylate.

Embodiment 22

The sized reinforcing fiber of embodiment 5, wherein the at least one sizing includes both the fluoropolymer and the compatible functional non-fluorinated polymer, wherein the compatible functional non-fluorinated polymer includes at least one monomer selected from the group consisting of acrylic acid, methacrylic acid, fumaric acid, crotonic acid, itaconic acid, hydroxyethyl methacrylate, hydroxyethyl acrylate, hydroxypropyl acrylate, hydroxypropyl methacrylate, diethylene glycol ethyl ether acrylate, glycidyl acrylate, glycidyl methacrylate, γ-trimethoxysilane methacrylate, γ-triethoxysilane methacrylate, acrolein, acrylonitrile, methacrylonitrile, and acetoacetoxyethyl methacrylate.

Embodiment 23

A sized reinforcing fiber comprising:
a) a reinforcing fiber selected from the group consisting of carbon fiber, aramid fiber, and glass fiber; and
b) at least one sizing selected from the group consisting of:
  i. a functionalized fluoropolymer, wherein at least one functional group of the functionalized fluoropolymer is adhered to the reinforcing fiber
  ii. both a fluoropolymer and a compatible functional non-fluorinated polymer, wherein at least one functional group of the compatible functional non-fluorinated polymer is adhered to the reinforcing fiber.
  iii. a functional PVDF copolymer comprising VDF monomer, optional fluorinated comonomer, and a functional comonomer such as acrylic acid, methacrylic acid, maleic anhydride, etc., wherein at least one functional group of the polymer is adhered to the reinforcing fiber.

Embodiment 24

The sized reinforcing fiber of embodiment 23, wherein the at least one sizing comprises the functionalized fluoropolymer and wherein the functionalized fluoropolymer is selected from the group consisting of functionalized vinylidene fluoride polymer, functionalized ethylene tetrafluoroethylene polymer, and functionalized ethylene chlorotrifluoroethylene polymer.

Embodiment 25

The sized reinforcing fiber of embodiments 23 and 24, wherein the at least one sizing includes both the functional fluoropolymer, and the fluoropolymer compatible functional non-fluorinated polymer wherein the functionalized fluoropolymer is selected from the group consisting of functionalized vinylidene fluoride polymer, functionalized ethylene tetrafluoroethylene polymer, and functionalized ethylene chlorotrifluoroethylene polymer.

Embodiment 26

The sized reinforcing fiber of embodiments 23 to 25, wherein the fluoropolymer is free of functional groups.

Embodiment 27

The sized reinforcing fiber of embodiments 23 to 26 wherein the fluoropolymer is functionalized.

DETAILED DESCRIPTION

All references cited herein are expressly incorporated by reference in their entirety. Unless otherwise stated, all molecular weights are weight average molecular weights as determined by Gas Permeation Chromatography (GPC), and all percentages are percentage by weight.

The term "copolymer" as used herein indicates a polymer composed of two or more different monomer units, including two comonomers, three comonomers and polymers having more than three different monomers. The copolymers may be random, alternating, or block, may be heterogeneous or homogeneous, may be linear, branched, comb or star polymers, and may be synthesized by a batch, semi-batch or continuous process.

The term "matrix" as used herein indicates the polymers that are added to the sized reinforcing fibers to make a thermoplastic composite. When the matrix fluoropolymer is compatible with the functional fluoropolymer sizing, the matrix can co-crystallize and blends with the sizing at a molecular scale—allowing optimal stress transfer to the reinforcing fiber resulting in higher strength and chemical resistance. For sizing using multiple polymers, at least one polymer of the one or more polymer sizings adhere or bond directly to the reinforcing fibers. Other polymers of the one or more polymer sizings may be entangled with the at least one polymer bonded directly to the reinforcing fibers. But in all cases the functional fluoropolymer is one of the one or more polymers, and this is compatible with matrix fluoropolymer resulting in enhanced strength.

Described herein are sized reinforcing fibers comprising a reinforcing fiber sized with a fluoropolymer. In some embodiments, the fluoropolymer is a polyvinylidene fluoride (PVDF), an ethylene tetrafluoroethylene, or an ethylene chlorotrifluoroethylene. In some embodiments, the reinforcing fiber is a carbon fiber, a glass fiber, or an aramid fiber.

In some embodiments, the fluoropolymer is a functionalized fluoropolymer. The functionalized fluoropolymer may be a functionalized vinylidene fluoride polymer, a functionalized ethylene tetrafluoroethylene polymer, or a functionalized ethylene chlorotrifluoroethylene polymer. In some embodiments, at least one functional group of the functionalized fluoropolymer is adhered to the reinforcing fiber. In some embodiments, an existing sizing is bonded to the reinforcing fiber and at least one functional group of the functionalized fluoropolymer is bonded to the existing sizing of the reinforcing fiber. In some embodiments, at least one functional group of the functionalized fluoropolymer is bonded to the reinforcing fiber and at least one functional group of the functionalized fluoropolymer is bonded to the existing sizing of the reinforcing fiber.

In some embodiments, the reinforcing fiber is sized with the fluoropolymer and a fluoropolymer compatible functional non-fluorinated polymer such as a functional acrylic copolymer. The fluoropolymer becomes entangled with the compatible functional non-fluorinated polymer. The fluoropolymer may be described as interwoven with the compatible functional non-fluorinated polymer. In some embodiments, at least one functional group of the compatible functional non-fluorinated polymer is adhered to the reinforcing fiber.

In some embodiments, the compatible functional non-fluorinated polymer includes at least one monomer selected from the group consisting of α,β unsaturated carboxylic acids, an acrylic monomer containing a hydroxyl group, a monomer containing an epoxy group, a monomer containing silanols, a monomer containing an aldehyde, an alkenyl cyanide, anhydride and acetoacetoxyethyl methacrylate. In some embodiments, the compatible functional non-fluorinated polymer is a functional acrylic copolymer containing at least one methacrylic acid or acrylic acid monomer and at least one methyl methacrylate monomer. In some embodiments, the compatible functional non-fluorinated copolymer is an acid copolymer wherein the acid groups are converted in part to anhydride functionality. In some embodiments, the compatible functional non-fluorinated copolymer contains glycidyl methacrylate.

In some embodiments wherein the reinforcing fiber is sized with the fluoropolymer and the compatible functional non-fluorinated polymer, the fluoropolymer is free of functional groups. In some embodiments, the fluoropolymer is a vinylidene fluoride polymer, an ethylene tetrafluoroethylene polymer, or an ethylene chlorotrifluoroethylene polymer.

In some embodiments wherein the reinforcing fiber is sized with the fluoropolymer and the compatible functional non-fluorinated polymer, the fluoropolymer is functionalized. The functionalized fluoropolymer may be a functionalized vinylidene fluoride polymer, a functionalized ethylene tetrafluoroethylene polymer, or a functionalized ethylene chlorotrifluoroethylene polymer. In some embodiments, at least one functional group of the functionalized fluoropolymer is adhered to the reinforcing fiber. In some embodiments, an existing sizing is bonded to the reinforcing fiber and at least one functional group of the functionalized fluoropolymer is bonded to the existing sizing of the reinforcing fiber. In some embodiments, at least one functional group of the functionalized fluoropolymer is bonded to the reinforcing fiber and at least one functional group of the functionalized fluoropolymer is bonded to the existing sizing of the reinforcing fiber.

In some embodiments the functional fluoropolymer is created by a co-polymerization with a functional monomer such as an acid, anhydride, epoxide, etc. In some cases the functional fluoropolymer is created by using a functional chain transfer agent or a functional initiator.

The hydrophilic comonomers used in combination with the one or more fluoromonomers include, but are not limited to one or more of the following, with mixtures of more than one monomer in a particular class, and two or more monomers from different classes below, being blended together to form a terpolymer:

A) Vinyl alkyl acids,
having as a comonomer (M1):

Wherein R1, R2, and R3 is a hydrogen or a halogen (F, Cl, Br, I).
Wherein R4 is a C1 to C16 linear, branched, aryl, or cycloalkyl group, a C1 to C16 fluorinated linear, branched, aryl or cycloalkyl group, an oligomer of hexfluoropropylene oxide or an oligomer of tetrafluoroethylene oxide.
Wherein R5 is carboxylic acid (C(O)OH), alkali metal carboxylate salt (COO$^-$M$^+$), ammonium carboxylate salt (COO$^-$NH$_4^+$), alkylammonium carboxylate salt (COO$^-$N(Alk)$_4^+$), alcohol (OH), amide (C(O)NH$_2$), dialkyl amide (C(O)NAlk$_2$), sulfonic acid (S(O)(O)OH), alkali metal sulfonate salt (S(O)(O)O$^-$M$^+$), ammonium sulfonate salt (S(O)(O)O$^-$NH$_4^+$), alkylammonium sulfonate salt (S(O)(O)O$^-$N(Alk)$_4^+$).

B) Vinyl alkyl acids,
having the formula M2 below:

Wherein: R1, R2, and R3 is a hydrogen or a halogen (F, Cl, Br, I);
Wherein: R4 and R5 are, separately, hydrogen, a C1 to C16 linear alkyl, branched alkyl, aryl, or cycloalkyl group, a C1 to C16 fluorinated linear alkyl, branched alkyl, aryl or cycloalkyl group, an oligomer of hexfluoropropylene oxide or an oligomer of tetrafluoroethylene oxide, alkali metal ion (Li$^+$, Na$^+$, K$^+$, Rb$^+$, Cs$^+$), ammonium ion (NH$_4^+$), or alkylammonium (NAlk$_4^+$)

C) Functional acrylamides,
having as a comonomer (M3):

Wherein: R1, R2, and R3 is a hydrogen or a halogen (F, Cl, Br, I).

Wherein: R4 and R5, separately are a hydrogen, C1 to C16 linear, branched, aryl, or cycloalkyl group, a C1 to C16 fluorinated linear, branched, aryl or cycloalkyl group, an oligomer of hexfluoropropylene oxide or an oligomer of tetrafluoroethylene oxide.

Wherein: R5 and R6, separately are carboxylic acid (C(O)OH), alkali metal carboxylate salt (COO$^-$M$^+$), ammonium carboxylate salt (COO$^-$NH$_4^+$), alkylammonium carboxylate salt (COO$^-$N(Alk)$_4^+$), alcohol (OH), amide (C(O)NH$_2$), dialkyl amide (C(O)NAlk$_2$), sulfonic acid (S(O)(O)OH), alkali metal sulfonate salt (S(O)(O)O$^-$M$^+$), ammonium sulfonate salt (S(O)(O)O$^-$NH$_4^+$), alkylammonium sulfonate salt (S(O)(O)O$^-$N(Alk)$_4^+$), ketone (C(O)), or acetylacetonate (C(O)—CH2-C(O)), or phosphonate (P(O)(OH)2), alkali metal or ammonium phosphonate D) Carbonates,
  containing the comonomer M4:

Wherein: R1, R2, and R3 is a hydrogen or a halogen (F, Cl, Br, I).

Wherein: R4 is a bond, a C1 to C16 linear alkyl, branched alkyl, aryl, or cycloalkyl group, a C1 to C16 fluorinated linear alkyl, branched alkyl, aryl or cycloalkyl group.

Wherein: R5 is C1 to C16 cycloalkyl group, a C1 to C16 fluorinated cycloalkyl group, containing a carbonate group as part of the cyclic structure.

E) Vinyl Ethers, having as a comonomer (M5):

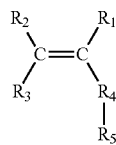

Wherein: R1, R2, and R3 is a hydrogen or a halogen (F, Cl, Br, I).

Wherein: R4 is a C1 to C16 linear, branched, aryl, or cycloalkyl group, a C1 to C16 fluorinated linear, branched, aryl or cycloalkyl group, an oligomer of hexfluoropropylene oxide or an oligomer of tetrafluoroethylene oxide.

Wherein: R5 is carboxylic acid (C(O)OH), alkali metal carboxylate salt (COO$^-$M$^+$), ammonium carboxylate salt (COO$^-$NH$_4^+$), alkylammonium carboxylate salt (COO$^-$N(Alk)$_4^+$), alcohol (OH), amide (C(O)NH$_2$), dialkyl amide (C(O)NAlk$_2$), sulfonic acid (S(O)(O)OH), alkali metal sulfonate salt (S(O)(O)O$^-$M$^+$), ammonium sulfonate salt (S(O)(O)O$^-$NH$_4^+$), alkylammonium sulfonate salt (S(O)(O)O$^-$N(Alk)$_4^+$), ketone (C(O)), acetylacetonate (C(O)—CH2-C(O))

F) Allyloxy compounds having as a comonomer (M6):

Wherein: R1, R2, and R3 is a hydrogen or a halogen (F, Cl, Br, I).

Wherein: R4 is a C1 to C16 linear, branched, aryl, or cycloalkyl group, a C1 to C16 fluorinated linear, branched, aryl or cycloalkyl group, an oligomer of hexfluoropropylene oxide or an oligomer of tetrafluoroethylene oxide.

Wherein: R5 is carboxylic acid (C(O)OH), alkali metal carboxylate salt (COO$^-$M$^+$), ammonium carboxylate salt (COO$^-$NH$_4^+$), alkylammonium carboxylate salt (COO$^-$N(Alk)$_4^+$), alcohol (OH), amide (C(O)NH$_2$), dialkyl amide (C(O)NAlk$_2$), sulfonic acid (S(O)(O)OH), alkali metal sulfonate salt (S(O)(O)O$^-$M$^+$), ammonium sulfonate salt (S(O)(O)O$^-$NH$_4^+$), alkylammonium sulfonate salt (S(O)(O)O$^-$N(Alk)$_4^+$), ketone (C(O)), or acetylacetonate (C(O)—CH2-C(O)), or phosphonate (P(O)(OH)2), alkali metal or ammonium phosphonate.

G) Multi-hydrophilic group comonomers
  Monomers having two or more hydrophilic groups are also contemplated by the invention. These include, but are not limited to itaconic acid, maleic acid, glutaconic acid, fumaric acid, and the anhydrides, alkali metal salts, ammonium, and mono-, di-, tri-, and tetraalkylammonium salts thereof.

The hydrophilic comonomers may be used in an amount, for example, of from about 0.01 to about 15 weight percent based on total monomer. Preferably they are used in an amount from about 0.01 to about 5 weight percent based on total monomer. In various embodiments, the total amount of hydrophilic monomer(s) is at least 0.01, at least 0.05, at least 0.1, at least 1.0 or at least 2.0 weight percent based on total monomer. In other embodiments, the total amount of hydrophilic monomer does not exceed 13.0, 10.0, 9.0, 7.0, 6.0, 5.0 weight percent based on total monomer. The hydrophilic comonomer may be used in solution such as in aqueous solution for convenient handling.

In some embodiments, the reinforcing fiber is sized with a functional chemical sizing, optionally which includes a first polymer containing at least one functional group. The reinforcing fiber is subsequently sized with a functionalized PVDF. At least one functionalized group on the functionalized PVDF forms a bond with at least one functional group of the chemical sizing and/or first polymer in that sizing.

In some embodiments, the reinforcing fiber is a carbon fiber and is activated to form functional groups such as oxygen or amine containing functional groups. In some embodiments, the oxygen containing functional groups are C═O groups. The carbon fiber is then sized with a functionalized PVDF. Functionalized groups on the functionalized PVDF form adheres to or bonds with the functional groups on the carbon fiber.

In some embodiments, the reinforcing fiber is a glass fiber and the fluoropolymer is a functionalized PVDF, wherein at least one functional group of the functionalized PVDF is bonded to the glass fiber. In some embodiments, the sized reinforcing fiber comprises a silane coupling agent. The silane coupling agent includes a group that can silane bond to the glass fiber and a functional group. In some embodiments, the functional group of the silane coupling agent is an epoxy group or an amide group. The functional group of the silane coupling agent can be bonded to the functionalized PVDF. In some embodiments, the functional group of the silane coupling agent is bonded to a first functional sizing polymer and the functionalized PVDF bonds to the first functional sizing polymer.

Functional Chain Transfer Agents

The functionalized fluoropolymer may be a block copolymer having a long fluoropolymer or fluoro-copolymer chain, and one or more short functional end blocks. The functional end blocks are formed from functional chain transfer agents.

The functional chain transfer agents of some embodiments are low molecular weight functional polymers. By low molecular weight is meant a polymer with a degree of polymerization of less than or equal to 1,000, and preferably less than 800. In a preferred embodiment, the weight average molecular weight of the polymeric chain transfer agent, as measured by GPC, is 20,000 g/mole of less, more preferably 15,000 g/mole, and more preferably less than 10,000 g/mole. In one embodiment the weight average molecular weight is less than 5,000 g/mole. The low molecular weight functional chain transfer agent is a polymer or an oligomer having two or more monomer units, and preferably at least three or more monomer units. In some embodiments, the low molecular weight functional chain transfer agent is a polymer or an oligomer having ten or more monomer units.

By functional polymeric chain transfer agents, as used in some embodiments, is meant that the low molecular weight polymer chain transfer agent contains one or more different functional groups. The chain transfer agent has the formula $(CH_2-CH-(X)-R)_y$, where y is a integer of between 2 to 1000, X is a linking group including, but not limited to, a covalent or ionic bond, an alkyl, alkene, alkyne, substituted alkyl, substituted alkene, aryl, ester, ether, ketone, amine, amid, amide, organo-silane, and R is a functional group.

The functional group (R) provides functionality, and can be provided by the polymerization of functional monomers—either as the sole monomer, or as a comonomer. The functionality could be added by introducing functional chain transfer agents to the polymerization media prior to polymerization and/or during the polymerization reaction. Useful functional groups include, but are not limited to, carboxylic, hydroxyl, siloxane, ether, ester, sulfonic, phosphoric, phosphonic, sulfuric, amide and epoxy groups, or a mixture thereof. Some embodiments include functional chain transfer agents including, but not limited to, polyacrylic acid, polylactic acid, polyphosphonic acid, polysulfonic acid, and polymaleic acid. In the case of acid groups, the functional groups may be partially or fully neutralized and/or esterified. Polyacrylic acid chain transfer agents are a preferred embodiment.

The low molecular weight functional chain transfer agent is present in the polymerization reaction at from 0.1 to 25 percent by weight, based on the total amount of monomer. Preferably the level is from 0.25 to 15 percent by weight, more preferably from 0.5 to 10 weight percent. In one embodiment, the level of the chain transfer agent is from greater than 2 weight percent, to 10 weight percent, and even 2.2 to 8 weight percent. If the level of the functionalized chain transfer agent is too low, there is not enough functionality provided to the PVDF to provide any significant performance advantage, nor enough to obtain the desired molecular weight.

The low molecular weight polymeric functional chain transfer agent reacts with the active center of the growing polymer chain, resulting in the extraction of the H of the CH and the attachment of the residual low molecular weight functional group to the polymer chain. This polymeric chain transfer agent differs from a comonomer, in that it does not disrupt the sequencing distribution of the PVDF backbone. The presence of the residual low molecular weight functional polymer chain transfer agent can be detected in the functionalized PVDF by means of NMR.

In addition to the low molecular weight, functional chain transfer agent of some embodiments, other chain transfer agents typically used in the polymerization of PVDF may also be added at levels to provide the desired molecular weight.

In general, a portion of, or all of the low molecular weight chain transfer agent is added to the initial charge, to prevent the formation of extremely high molecular weight polymer that is non-soluble in polar solvents—and which exists as gels. The remainder of the chain transfer agent can then be added continuously, or in small portions through the remainder of the polymerization.

The functional chain transfer agent creates a block copolymer, with a fluoropolymer block and the functional non-fluoropolymer end block. In another embodiment, hydrophilic functionality is present as both a low level of functional monomer as part of the fluoropolymer backbone, and also as a hydrophilic non-fluoropolymer end block. Surprisingly, this block copolymer shows a synergistic effect, even with very low hydrophilic monomer levels in the fluoropolymer block. The hydrophilic comonomers in the fluoropolymer block may be used in an amount, for example, of from about 0.0001 to about 10 weight percent based on total monomer. Hydrophilic monomer levels of less than 500 ppm, less than 250 ppm, less than 100 ppm, less than 50 ppm, and even down to 10 ppm based on the total monomer in the fluoropolymer block provides a synergystic improvement in adhesive and other properties.

The hydrophilic monomer during the synthesis of the fluoropolymer block is either randomly distributed in the polymer background, forms a homopolymer, or is unreacted. In one embodiment the hydrophilic monomer is a (meth) acrylic monomer, and the non-fluoropolymer block is a polymer of (meth)acrylic monomers. In this case, the total amount of the (meth)acrylic monomer units that are randomly distributed in the fluoropolymer block is less than 40 mole percent, preferably less than 30 mole percent, preferably less than 25 mole percent, and even less than 20 mole %, less than 15 mole percent, and even less than 10 mole percent of the total (meth)acrylic monomer units in the entire block copolymer. The mole percent of (meth)acrylic monomer units randomly distributed in the fluoropolymer block of the block copolymer is low due to the low mole percent of (meth)acrylic monomer in the fluoropolymer block, and the higher level of (meth)acrylic monomer units incorporated into the non-fluoropolymer block. The (meth) acrylic monomer in the fluoropolymer block can be the same or different than the (meth)acrylic monomer in the non-fluoropolymer block. In one preferred embodiment, acrylic acid monomer units are present in both the fluoropolymer block and the non-fluoropolymer block.

The functional fluoropolymer block of the block copolymer has a high molecular weight, where the end groups having formula $-CF_2H$ and/or $-OSO_3H$ and/or $-OH$ are in an amount of at less than 30 mmoles per Kg of vinylidene fluoride (VDF) recurring units, preferably less than 25 mmoles per Kg VDF, and more preferably less than 20 mmoles per Kg VDF.

In a preferred embodiment, the chain transfer agent is used in conjunction with a surfactant to stabilize the growing polymer chains. The surfactant can be any surfactant known to stabilize fluoropolymers, and can be one or more fluorinated surfactants, one or more non-fluorinated surfactants, or a mixture of fluorinated and non-fluorinated surfactants. In a preferred embodiment, the polymerization is carried out without any fluorinated surfactant, as has been shown by Applicant in previous patent applications. Useful non-fluorinated surfactant can produce stable emulsions having a particle size in the range of from 50 to 250 nm.

In one embodiment, the functional fluoropolymer is a block copolymer having with a fluropolymer block and the functional non-fluoropolymer end block. In another embodiment, hydrophilic functionality is present as both a low level of functional monomer as part of the fluoropolymer backbone, and also as a hydrophilic non-fluropolymer end block. Surprisingly, this block copolymer shows a synergistic effect, even with very low hydrophilic monomer levels in the fluoropolymer block. The hydrophilic comonomers in the fluropolymer block may be used in an amount, for example, of from about 0.0001 to about 10 weight percent based on total monomer. Hydrophilic monomer levels of less than 500 ppm, less than 250 ppm, less than 100 ppm, less than 50 ppm, and even down to 10 ppm based on the total monomer in the fluoropolymer block provides a synergystic improvement in adhesive and other properties.

The hydrophilic monomer during the synthesis of the fluoropolymer block is either randomly distributed in the polymer background, forms a homopolymer, or is unreacted. In one embodiment the hydrophilic monomer is a (meth) acrylic monomer, and the non-fluoropolymer block is a polymer of (meth)acrylic monomers. In this case, the total amount of the (meth)acrylic monomer units that are randomly distributed in the fluoropolymer block is less than 40 mole percent, preferably less than 30 mole percent, preferably less than 25 mole percent, and even less than 20 mole %, less than 15 mole percent, and even less than 10 mole percent of the total (meth)acrylic monomer units in the entire block copolymer. The mole percent of (meth)acrylic monomer units randomly distributed in the fluoropolymer block of the block copolymer is low due to the low mole percent of (meth)acrylic monomer in the fluoropolymer block, and the higher level of (meth)acrylic monomer units incorporated into the non-fluoropolymer block. The (meth) acrylic monomer in the fluoropolymer block can be the same or different than the (meth)acrylic monomer in the non-fluoropolymer block. In one preferred embodiment, acrylic acid monomer units are present in both the fluoropolymer block and the non-fluoropolymer block.

The functional fluoropolymer block of the block copolymer has a high molecular weight, where the end groups having formula —$CF_2H$ and/or —$OSO_3H$ and/or —OH are in an amount of at less than 30 mmoles per Kg of vinylidene fluoride (VDF) recurring units, preferably less than 25 mmoles per Kg VDF, and more preferably less than 20 mmoles per Kg VDF.

Vinylidene Fluoride Polymer

The term "vinylidene fluoride polymer" or "PVDF-based polymers" used herein includes both normally high molecular weight homopolymers and copolymers (meaning two or more types of monomer units within its meaning). Such copolymers include those containing at least 50 mole percent, and preferably at least 65 mole percent of vinylidene fluoride optionally copolymerized with at least one comonomer, such as, but not limited to: tetrafluoroethylene, trifluoroethylene, chlorotrifluoroethylene, hexafluoropropene, 2,3,3,3-tetrafluoro-propene, 3,3,3-trifluoro-propene, vinyl fluoride, pentafluoropropene, perfluoromethyl vinyl ether, perfluoropropyl vinyl ether and any other monomer that would readily copolymerize with vinylidene fluoride.

Particularly preferred copolymers are those composed of from at least about 70 and up to 99 mole percent vinylidene fluoride, and correspondingly from 1 to 30 percent tetrafluoroethylene, such as disclosed in British Patent No. 827,308; about 70 to 99 percent vinylidene fluoride and 1 to 30 percent hexafluoropropene (see for example U.S. Pat. No. 6,586,547); and about 70 to 99 mole percent vinylidene fluoride and 1 to 30 mole percent trifluoroethylene, 2,3,3,3-tetrafluoro-propene, and/or 3,3,3-trifluoro-propene. Terpolymers of vinylidene fluoride with hexafluoropropene and tetrafluoroethylene such as described in U.S. Pat. No. 2,968,649 are also preferred.

Polymerization Process

With respect to the preferred method of making the functionalized PVDF of some embodiments, initially, deionized water, at least one surfactant—typically at a level of from 0.01 to less than 2.0 weight percent based on the amount of monomer, preferably non-fluorinated surfactant, and a portion of the low molecular weight functional polymer chain transfer agent are introduced into a reactor followed by deoxygenation. After the reactor reaches the desired temperature, vinylidene fluoride (VDF) monomer and optional comonomer is added to the reactor to reach a predetermined pressure. Next a free radical initiator is introduced to the reactor with suitable flow rate to maintain proper polymerization rate. Once the reaction has started or simultaneously with the beginning of the reaction, the rest of low molecular weight functional polymer chain transfer agent and vinylidene fluoride (VDF) monomers are continuously fed at a desired ratio into the reactor. After reaching the desired polymer solids level, the feed of the monomers can be stopped but the charge of the initiator is preferably maintained to consume any residual monomers in the reactor. The initiator charge can then be stopped, the reactor pressure dropped and the reactor cooled. The unreacted monomers can be vented and the functionalized PVDF collected through a drain port or other collection means. The functionalized PVDF can then be isolated using standard isolation techniques such as oven drying, spray drying, shear or acid coagulation followed by drying and so on, or the functionalized PVDF may be kept in the emulsion form for subsequent applications.

Polyvinylidene Fluoride and a Functional Acrylic Copolymer

In some embodiments, a sized reinforcing fiber comprises a reinforcing fiber and a polyvinylidene polymer blend containing polyvinylidene fluoride and a compatible functional non-fluorinated polymer such as a functional acrylic copolymer of at least one methacrylic acid or acrylic acid monomer and at least one methyl methacrylate monomer. The compatible functional non-fluorinated polymer is compatible with the polyvinylidene fluoride. The polyvinylidene fluoride and the compatible functional non-fluorinated polymer are melt blended to form the polyvinylidene polymer blend and then added as sizing.

In some embodiments, the compatible functional non-fluorinated polymer includes at least one monomer selected from the group consisting of α,β unsaturated carboxylic acids, an acrylic monomer containing a hydroxyl group, a monomer containing an epoxy group, a monomer containing silanols, a monomer containing an aldehyde, an alkenyl cyanide, and acetoacetoxyethyl methacrylate.

In some embodiments, a monomer containing an α,β unsaturated carboxylic acids is at least one monomer selected from the group consisting of acrylic acid, methacrylic acid, fumaric acid, crotonic acid, and itaconic acid.

In some embodiments an acrylic monomer containing a hydroxyl group is selected from the group consisting of hydroxyethyl methacrylate, hydroxyethyl acrylate, hydroxypropyl acrylate, hydroxypropyl methacrylate, and diethylene glycol ethyl ether acrylate.

In some embodiments, a monomer containing an epoxy group is selected from the group consisting of glycidyl acrylate and glycidyl methacrylate.

In some embodiments, a monomer containing silanols is selected from the group consisting of γ-trimethoxysilane methacrylate and γ-triethoxysilane methacrylate.

In some embodiments, a monomer containing an aldehyde is acrolein.

In some embodiments, an alkenyl cyanide monomer is selected from the group consisting of acrylonitrile and methacrylonitrile.

In some embodiments, the compatible functional non-fluorinated polymer includes at least one monomer selected from the group consisting of acrylic acid, methacrylic acid, fumaric acid, crotonic acid, itaconic acid, hydroxyethyl methacrylate, hydroxyethyl acrylate, hydroxypropyl acrylate, hydroxypropyl methacrylate, diethylene glycol ethyl ether acrylate, glycidyl acrylate, glycidyl methacrylate, γ-trimethoxysilane methacrylate, γ-triethoxysilane methacrylate, acrolein, acrylonitrile, methacrylonitrile, and acetoacetoxyethyl methacrylate.

In some embodiments, the compatible functional non-fluorinated polymer is a functional acrylic copolymer containing at least one methacrylic acid monomer and at least one methyl methacrylate monomer. In some embodiments, the compatible functional non-fluorinated copolymer is an acid copolymer wherein the acid groups are converted in part to anhydride functionality.

In some embodiments, the fluoropolymer is free of functional groups. In some embodiments, the fluoropolymer is a vinylidene fluoride polymer, an ethylene tetrafluoroethylene polymer, or an ethylene chlorotrifluoroethylene polymer.

In some embodiments, the fluoropolymer is functionalized. The functionalized fluoropolymer may be a functionalized vinylidene fluoride polymer, a functionalized ethylene tetrafluoroethylene polymer, or a functionalized ethylene chlorotrifluoroethylene polymer. In some embodiments, at least one functional group of the functionalized fluoropolymer is bonded to the reinforcing fiber. In some embodiments, an existing sizing is bonded to the reinforcing fiber and at least one functional group of the functionalized fluoropolymer is bonded to the existing sizing of the reinforcing fiber. In some embodiments, at least one functional group of the functionalized fluoropolymer is adhered to the reinforcing fiber and at least one functional group of the functionalized fluoropolymer is adhered to the existing sizing of the reinforcing fiber.

In some embodiments, the polyvinylidene polymer blend comprises from about 1% to about 20% by weight of the functional acrylic copolymer. In some embodiments, the polyvinylidene polymer blend comprises less than 5% by weight of the functional acrylic copolymer. Without being bound by theory, excessive functional acrylic copolymer may decrease the chemical resistance of a sized reinforcing fiber comprising the polyvinylidene polymer or copolymer containing polyvinylidene fluoride and the functional acrylic copolymer.

The functional acrylic copolymer may comprise from about 1.5% to about 15% by weight of methacrylic acid monomer. In some embodiments, the functional acrylic copolymer may comprise from about 5% to about 15% by weight of methacrylic acid monomer. In some embodiments, the functional acrylic copolymer may comprise from about 6% to about 11% by weight of methacrylic acid monomer.

As discussed above, in some embodiments, the polyvinylidene polymer blend comprises PVDF and the functional acrylic copolymer. The total content of methacrylic acid monomer may be described as a portion of the entire polyvinylidene polymer blend or as a portion of the functional acrylic copolymer. Unless specified otherwise, methacrylic acid monomer is described as a fraction of the polyvinylidene polymer blend.

The polyvinylidene polymer blend may comprise from about 50 ppm to about 30,000 ppm by weight of methacrylic acid monomer. In some embodiments, the polyvinylidene polymer blend may comprise from about 500 ppm to about 10,000 ppm by weight of methacrylic acid monomer.

In some embodiments, the polyvinylidene polymer blend may comprise at least about 100 ppm, about 200 ppm, about 300 ppm, about 400 ppm, about 500 ppm, about 600 ppm, about 700 ppm, about 800 ppm, about 900 ppm, about 1000 ppm, about 2000 ppm, about 3000 ppm, about 4000 ppm, or about 5000 ppm by weight of methacrylic acid monomer.

In some embodiments, the polyvinylidene polymer blend may comprise at most about 10,000 ppm, about 5000 ppm, about 2800 ppm, about 2600 ppm, about 2500 ppm, about 2400 ppm, about 2300 ppm, about 2200 ppm, about 2100 ppm, about 2000 ppm, about 1900 ppm, about 1800 ppm, about 1700 ppm, about 1600 ppm, about 1500 ppm, about 1400 ppm, about 1300 ppm, about 1200 ppm, about 1100 ppm, or about 1000 ppm by weight of methacrylic acid monomer.

Functionalized PVDF

Functionalized PVDF is a PVDF comprising at least one functional group. Functionalized PVDF may include the polyvinylidene polymer or copolymers discussed above. In some embodiments, the functionalized PVDF is a polyvinylidene polymer or copolymer containing polyvinylidene fluoride and a low molecular weight functional polymer chain transfer agent. In some embodiments, other functionalized PVDFs may be contemplated.

In some embodiments, other functionalized PVDFs include a PVDF grafted with specific functional groups. Useful functional groups include, carboxylic, hydroxyl, siloxane, ether, ester, sulfonic, phosphoric, phosphonic, sulfuric, amide, and epoxy groups, or a mixture thereof. In one embodiment, maleic anhydride grafts are not present.

In some embodiments, other functionalized PVDFs may be prepared by blending a pure PVDF with a PVDF that has functional groups grafted onto a PVDF backbone.

In some embodiments, the functional is a PVDF copolymerized with functional co-monomers such as acids, epoxide, anhydrides, etc.

Carbon Fibers Sized with Functionalized PVDF

In some embodiments, the reinforcing fiber is carbon. In some embodiments, a sized carbon fiber may comprise from about 0.15% to about 8% by weight of the functionalized PVDF. In some embodiments, the sized carbon fibers may comprise from about 0.15% to about 3% by weight of the functionalized PVDF.

In some embodiments, the sized carbon fiber may comprise at least about 0.15%, about 0.25%, about 0.3%, about 0.4%, about 0.5%, about 0.6%, about 0.7%, about 0.8%, about 0.9%, about 1%, about 1.2%, or about 1.3% by weight of functionalized PVDF.

In some embodiments, the sized carbon fiber may comprise at most about 8%, about 6%, about 4%, about 3%, about 2.8%, about 2.6%, about 2.5%, about 2.4%, about 2.3%, about 2.2%, about 2.1%, about 2%, about 1.9%, about 1.8%, about 1.7%, about 1.6%, about 1.5%, about 1.4%, about 1.3%, about 1.2%, about 1.1%, or about 1% by weight of functionalized PVDF.

Sized Activated Carbon Fiber

In some embodiments, a sized carbon fiber is prepared by using an activating a carbon fiber that has functional groups on it's surface to enhance adhesion to a polymer matrix or other sizing.

Activated carbon fibers may be sized with functionalized PVDF by any method known in the art. Sizings can be applied from a water dispersion, a solvent solution, a fine powder application or other techniques known in the art. Without wishing to be bound by theory, the functionalized PVDF forms adheres or bonds to the activated carbon fiber surface.

Sizing Carbon Fiber with a Functionalized Compatible Non-Fluorinated Polymer

In some embodiments, a carbon fiber is sized with a compatible functional non-fluorinated polymer. The compatible functional non-fluorinated polymer is compatible with the fluoropolymer, as discussed above. In some embodiments, the fluoropolymer is a PVDF polymer or copolymer. In some embodiments, the compatible functional non-fluorinated polymer is a functional acrylic copolymer containing at least one methacrylic acid monomer and at least one methyl methacrylate monomer.

In some embodiments, the compatible functional non-fluorinated polymer is a methacrylic acid copolymer with methyl methacrylate. Because it is compatible with PVDF and PVDF copolymers, when added to a PVDF matrix the compatibility at the molecular scale, the functionality in the acrylic encourages good interfacial adhesion strength between the fiber and the PVDF or PVDF copolymer matrix, improving composite properties.

Example of Commercial "Sized Carbon Fibers"

Some carbon fibers sized with a non-fluorinated sizing are available commercially (see Table 1 and Table 2). None of these sizings are noted as compatible or suitable with PVDF. This illustrates that no functional fluoropolymer sizing is available today.

Carbon Fibers from Mitsubishi:

PYROFIL™ Chopped Fiber is available from Mitsubishi Rayon Co., Ltd. Standard small-tow PYROFIL™ Chopped Fiber may comprise a sizing agent selected from the group consisting of urethane, polyamide, epoxy, water, or water dispersable polyamide. None of these are compatible with PVDF or fluoropolymers.

TABLE 1

| ITEM | Carbon Fiber | Sizing Type | Sizing Ratio | Fiber Length | Preferable Matrix Resin |
|---|---|---|---|---|---|
| TR06U | Standard Small-Tow | Urethane | 2.5% | 6 mm | ABS, PC, PBT, etc. |
| TR06NE | | Polyamide | 3.0% | 6 mm | PA, PPS, PEI, PES, etc. |
| TR06Q | | Epoxy | 2.5% | 6 mm | POM, PC, PPE, etc. |
| TR066A | | Epoxy | 3.0% | 6 mm | PPS, PC, PET, ABS, Thermoset |
| TR03CM | | Water | 12.0% | 6 mm | Inorganic material, Papar, Phenol |
| TR03M | | Water Dispersible Polyamide | 1.5% | 3 mm | Inorganic material, Papar, Phenol |
| TR06UL | Standard Large-Tow | Urethane | 2.5% | 3 mm | ABS, PC, PBT, etc. |
| TR06NL | | Polyamide | 3.0% | 6 mm | PA, PPS, PEI, PES, etc. |
| TR06YL | | Modified Epoxy | 4.2% | 6 mm | PPS, etc. |
| TR06QL | | Modified Epoxy | 2.5% | 6 mm | POM, PC, PPE, etc. |
| MR03NE | Intermediate Modulus-Tow | Polyamide | 3.0% | 3 mm | PA, PPS, PEI, PES, etc. |

Carbon Fibers from Nippon:

Chopped carbon fiber is also available from Nippon Polymer Sangyo Co., Ltd. Carbon fiber may be purchased that has been sized with a sizing agent consisting of urethane, epoxy and urethane, epoxy, olefin, acrylic, or acrylic and urethane. The sizing agent may be in a variety of concentrations. Sizing from Nippon Polymer Sangyo Co., Ltd. May be 1.5%, 3%, or 5% by weight of the sizing agent. None of these are compatible with PVDF or fluoropolymers.

TABLE 2

| Grade | Type | Sizing Agent | Content % | Cut Length mm | Package (kg/bag) | Main Application |
|---|---|---|---|---|---|---|
| CF-N | — | — | max 0.5 | 3-50 | 20 | Carbon Paper |
| CFU | LC MC HC | Urethane | LC:1.5 | 3-12 | | ABS, PBT, PP, PC, PA |
| CFEPU | | Epoxy + Urethane | MC:3.0 | | | PBT, PC, PA, PPO |

TABLE 2-continued

| Grade | Type | Sizing Agent | Content % | Cut Length mm | Package (kg/bag) | Main Application |
|---|---|---|---|---|---|---|
| CFEPP | | Epoxy | HC:5.0 | | | PBT, PC, PA, POM |
| CFOF | | Olefin | | | | PP, PPA, PPS, PI, PA6T |
| CFA4 | | Acrylic | | | | PP, PPA, PPS, PI, PA6T, PEEK |
| CFAU* | | Acrylic + Urethane | | | | PP, PPA, PPS, PI, PA6T, PEEK |

*Under Development

Sizing Carbon Fiber Sized with Another Sizing

A carbon fiber sized with another polymer containing functional groups could be further sized with a functionalized PVDF.

For example, an amide sized carbon fiber could be further sized with a functional PVDF such as an anhydride functional PVDF.

Or a carbon fiber sized with an epoxy sizing could be further sized with a functional PVDF such as acid functionalized PVDF or a hydroxyl functionalized PVDF.

Sizing Carbon Fiber

Processes for sizing carbon fiber can be any method known in the art. In an example, carbon fiber is extended on a reel. The carbon fiber is spooled out and run over a set of rollers. The sizing can be applied at the levels noted above in the form of an aqueous dispersion, a solution in a solvent, etc. In each case some effort is made to fully coat the fibers with "sizing" to form a more or less continuous coating on the fibers. The solvent or water is dried off the surface and the temperature may be raised to a point above the melting point of the sizing polymer or polymers. A sizing could contain more than "one" polymeric material.

Uses

Sized carbon fibers of some embodiments can find multiple end uses. One of ordinary skill in the art can imagine many uses for the sized carbon fibers, based on the following non-limiting examples. Uses include chemically resistant and high temperature applications in industry for chemical plants, oil exploration, automobiles, and transportation.

Aramid Fibers Sized with Functionalized PVDF

In some embodiments, the reinforcing fiber is aramid. In some embodiments, an sized aramid fiber may comprise from about 0.15% to about 8% by weight of the functionalized PVDF. In some embodiments, the sized aramid fibers may comprise from about 0.15% to about 3% by weight of the functionalized PVDF.

In some embodiments, the sized aramid fiber may comprise at least about 0.15%, about 0.25%, about 0.3%, about 0.4%, about 0.5%, about 0.6%, about 0.7%, about 0.8%, about 0.9%, or about 1% by weight of functionalized PVDF.

In some embodiments, the sized aramid fiber may comprise at most about 8%, about 6%, about 4%, about 3%, about 2.8%, about 2.6%, about 2.5%, about 2.4%, about 2.3%, about 2.2%, about 2.1%, about 2%, about 1.9%, about 1.8%, about 1.7%, about 1.6%, about 1.5%, about 1.4%, about 1.3%, about 1.2%, about 1.1%, or about 1% by weight of functionalized PVDF.

Sizing Aramid Fiber with a Functionalized Compatible Non-Fluorinated Polymer

In some embodiments, an aramid fiber is sized with a compatible functional non-fluorinated polymer. The compatible functional non-fluorinated polymer is compatible with the fluoropolymer, as discussed above. In some embodiments, the fluoropolymer is a PVDF polymer or copolymer. In some embodiments, the compatible functional non-fluorinated polymer is a functional acrylic copolymer containing at least one methacrylic acid monomer and at least one methyl methacrylate monomer.

In some embodiments, the aramid fibers are sized with functional fluoropolymers as described above. When added to a PVDF matrix the compatibility encourages good interfacial adhesion strength between the fiber and the PVDF or PVDF copolymer matrix, improving composite properties.

further sized with a functional fluoropolymer as described in this document.

Sizing Aramid Fiber Sized with Another Sizing

An aramid fiber sized with another polymer containing functional groups could be further sized with a functionalized PVDF.

For example, an amide sized aramid fiber could be further sized with a functional PVDF such as maleic anhydride or anhydride functional PVDF.

Sizing Aramid Fiber

Processes for sizing aramid fiber can be any method known in the art. In an example, aramid fiber is extended on a reel. The aramid fiber is spooled out and run over a set of rollers. The sizing can be applied at the levels noted above in the form of an aqueous dispersion, a solution in a solvent, etc. In each case some effort is made to fully coat the fibers with "sizing" to form a more or less continuous coating on the fibers. The solvent or water is dried off the surface and the temperature may be raised to a point above the melting point of the sizing polymer or polymers. A sizing could contain more than "one" polymeric material.

Uses

Sized aramid fibers of some embodiments can find multiple end uses. One of ordinary skill in the art can imagine many uses for the sized aramid fibers, based on the following non-limiting examples. Uses include chemically resistant and high temperature applications in industry for chemical plants, oil exploration, automobiles, and transportation.

Glass Fibers Sized with Functionalized PVDF

In some embodiments, the reinforcing fiber is glass fiber. In some embodiments, sized glass fibers may comprise from about 0.15% to about 8% by weight of the functionalized PVDF. In some embodiments, the sized glass fibers may comprise from about 0.15% to about 2% by weight of the functionalized PVDF.

In some embodiments, the sized glass fiber may comprise at least about 0.15%, about 0.25%, about 0.3%, about 0.4%, about 0.5%, about 0.6%, about 0.7%, about 0.8%, about 0.9%, or about 1% by weight of functionalized PVDF.

In some embodiments, the sized glass fiber may comprise at most about 8%, about 6%, about 5%, about 4%, about 3%, about 2.8%, about 2.6%, about 2.5%, about 2.4%, about 2.3%, about 2.2%, about 2.1%, about 2%, about 1.9%, about 1.8%, about 1.7%, about 1.6%, about 1.5%, about 1.4%, about 1.3%, about 1.2%, about 1.1%, or about 1% by weight of functionalized PVDF.

Sizing Glass Fiber Using a Silane Coupling Agent

In some embodiments, a sized glass fiber comprises at least one silane coupling agent. Glass fiber is sized with functionalized PVDF and at least one functional group on the functionalized PVDF forms a bond with at least one silane coupling agent bonded to the glass fiber.

In some embodiments, the silane coupling agent is an amino silane coupling agent where the silane group bonds to the glass surface through well-known chemistry and the amino group is available to bond with a sizing polymer or matrix polymer such as those described in this embodiment. In some embodiments, the silane is an epoxy silane wherein the silane group reacts with the glass surface and the epoxy group can react with the sizing polymer or matrix polymer described in this embodiment.

Silane treated glass fibers may be sized with functionalized PVDF by any method known in the art. Without wishing to be bound by theory, the functionalized PVDF forms a bond with the glass fiber because at least one functional group of the functionalized PVDF reacts with a silane coupling agent bonded to the glass fiber.

Sizing Glass Fiber with a Functionalized Compatible Non-Fluorinated Polymer

In some embodiments, a glass fiber is sized with a blend of fluoropolymer and fluoropolymercompatible functional non-fluorinated polymer. The compatible functional non-fluorinated polymer is compatible with the fluoropolymer, as discussed above. In some embodiments, the fluoropolymer is a PVDF polymer or copolymer. In some embodiments, the compatible functional non-fluorinated polymer is a functional acrylic copolymer containing at least one methacrylic acid monomer and at least one methyl methacrylate monomer.

In some embodiments, the compatible functional non-fluorinated polymer is a methacrylic acid copolymer with methyl methacrylate. Because it is compatible with PVDF and PVDF copolymers, when added to a PVDF matrix the compatibility encourages good interfacial adhesion strength between the fiber and the PVDF or PVDF copolymer matrix, improving composite properties.

Sizing Glass Fiber Sized with Another Sizing

A glass fiber sized with another polymer containing functional groups could be further sized with a functionalized PVDF.

For example, an amide sized glass fiber could be further sized with a functional PVDF such as maleic anhydride grafted PVDF.

Sizing Glass Fiber

Processes for sizing glass fiber can be any method known in the art. In an example, glass fiber is extended on a reel. The glass fiber is spooled out and run over a set of rollers. The sizing can be applied at the levels noted above in the form of an aqueous dispersion, a solution in a solvent, etc. In each case some effort is made to fully coat the fibers with "sizing" to form a more or less continuous coating on the fibers. The solvent or water is dried off the surface and the temperature may be raised to a point above the melting point of the sizing polymer or polymers. A sizing could contain more than "one" polymeric material.

Sizing for glass may occur during the glass fiber manufacturing process using an aqueous dispersion or solution of polymer sizing agents.

Uses:

Sized glass fibers of some embodiments can find multiple end uses. One of ordinary skill in the art can imagine many uses for the sized glass fibers, based on the following non-limiting examples. Uses include chemically resistant and high temperature applications in industry for chemical plants, oil exploration, automobiles, and transportation.

Composite Materials

Some embodiments include a composite material comprising any of the sized reinforcing fibers discussed throughout this application and a matrix material.

Functional PVDF Production Example

In some embodiments, functional polyvinylidene polymer is produced by the following process. Initially, deionized water, at least one surfactant—typically at a level of from 0.01 to less than 2.0 weight percent based on the amount of monomer, preferably non-fluorinated surfactant, and a portion of the low molecular weight functional polymer chain transfer agent are introduced into a reactor followed by deoxygenation. After the reactor reaches the desired temperature, vinylidene fluoride (VDF) monomer and optional comonomer is added to the reactor to reach a predetermined pressure. Next a free radical initiator is introduced to the reactor with suitable flow rate to maintain proper polymerization rate. Once the reaction has started or simultaneously with the beginning of the reaction, the rest of low molecular weight functional polymer chain transfer agent and vinylidene fluoride (VDF) monomers are continuously fed at a desired ratio into the reactor. After reaching the desired polymer solids level, the feed of the monomers can be stopped but the charge of the initiator is preferably maintained to consume any residual monomers in the reactor. The initiator charge can then be stopped, the reactor pressure dropped and the reactor cooled. The unreacted monomers can be vented and the polyvinylidene polymer containing collected through a drain port or other collection means. The functional polyvinylidene polymer can then be isolated using standard isolation techniques such as oven drying, spray drying, shear or acid coagulation followed by drying and so on, or the functional polyvinylidene polymer may be kept in the emulsion form for subsequent applications.

Properties

While not being bound by any theory, it is believed that the functional chain transfer agent residue concentrates functionality at the functionalized PVDF chain ends, potentially making the functionality less hindered than found in other methods of functionalization. The structure formed could take on the appearance of a block copolymer, having one or more PVDF blocks and one or more blocks of the polymeric chain transfer agent residue.

The functionalized PVDF of some embodiments would have both the properties (adhesion, cross-linkability) of the functional group, combined with water and chemical resistant of vinylidene fluoride resin.

EXAMPLES

The following examples should be considered as illustrative and not in limitation thereof.

Examples A

Into an 80-gallon stainless steel reactor was charged, 345 lbs of deionized water, 66 grams of a block poly(propylene glycol)-poly(ethylene glycol) non-ionic surfactant having a Mn of about 3,000 g/mol., and 5.5 lbs of 10% aqueous solution of a partially neutralized low molecular weight water soluble acrylic acid polymer, weight average molecular weight by aqueous GPC of 2,000) as the chain transfer agent. Following evacuation, agitation was begun at 23 rpm and the reactor was heated. After the reactor temperature reached the desired set point of 100° C., the vinylidene fluoride (VDF) charge was started. Reactor pressure was then raised to 650 psi by charging approximately 35 lbs VDF into the reactor. After the reactor pressure was stabilized, 4.5 lbs of initiator solution made of 1.0 wt % potassium persulfate and 1.0 wt % sodium acetate was added to the reactor to initiate polymerization. The rate of further addition of the initiator solution was adjusted to obtain and maintain a final VDF polymerization rate of roughly 60 pounds per hour. The VDF polymerization was continued until approximately 165 pounds VDF was introduced in the reaction mass along with 11.0 lbs of 10% aqueous solution partially neutralized low molecular weight (2,000 g/mol) water soluble acrylic acid polymer. The VDF feed was stopped and the batch was allowed to react-out at the reaction temperature to consume residual monomer at decreasing pressure while initiator feed was maintained. After 25 minutes, the agitation was stopped and the reactor was cooled, vented and the latex recovered. Solids in the recovered latex were determined by gravimetric technique and were about 30 weight % and solution viscosity at 5% in NMP was measured at shear rate of 10 sec$^{-1}$ to be 250 cp. The melting temperature and heat of fusion of resin were measured in accordance with ASTM method D-3418 to be 160° C.

Carbon Fiber Reinforced PVDF Experiments
Sizing Carbon Fibers:

All the examples of sized carbon fiber made with functional PVDF for this patent were made in the exact same way. Hexcel AS4 12,000 tow un-sized carbon fiber was used in all cases except the control examples. The "functional PVDF" was dissolved in DMAC (dimethyl acetamide) to make a 5% solids solution. A lab scale unit was set up to continuously size this carbon fiber, where the tow was coated, then excess squeezed out, the solvent removed and the sized fiber wound onto a reel.

The wetting tray held the 5% solids solution, and the AS4 tow was passed through this solution using a roller to hold it under the surface. The fiber tow was then passed between two non-moving soft rollers to squeeze out the excess solution and to promote good wet out of the sizing solution around the carbon fibers. The "wet sized" tow was then passed through a hot chamber heated to 150 C with lots of air flow and a dwell time of 90 seconds to remove all the solvent and end up with "dry" sized carbon fiber tow. By weighing one meter of carbon fiber before and after sizing— we calculated the amount of sizing. These sized carbon tow's were then chopped to a 6 mm length using an air driven chopper designed for fiber glass from Fibre Glast.

The sized carbon fiber examples and control carbon fiber are documented in Table 1 below. The commercial control carbon fiber sizing used for these trials was from Teijin Toho Tenax. The grade was HT C702—which is a carbon fiber sized for high temperature thermoplastics. This fiber is chopped to 6 mm length and available commercially.

Example 1 below is a homopolymer that incorporates 2500 ppm of acrylic acid into the polymerization as described elsewhere to produce a functional PVDF homopolymer with a melt viscosity of 14 kpoise at 100 sec-1 at 230 C.

Example 2 below is a homopolymer that incorporates 2500 ppm of acrylic acid into the polymerization and also adds 2500 ppm of an acid functional chain transfer agent as described elsewhere to produce a functional PVDF homopolymer with a melt viscosity of 14 kpoise.

Example 3 Sizing used here consisted of 90% of 6 kpoise viscosity homopolymer and 10% of a copolymer of methyl methacrylate and methacrylic acid where the MAA content is 10%. This MMA-MAA copolymer is compatible with PVDF.

TABLE 1

Sized Carbon Fibers for Example Numbers

| Carbon Fiber | Example # and Sizing | Dry Wt % Sizing |
|---|---|---|
| AS4 - 12,000 | 1: Acrylic acid functional PVDF (2500 ppm) | 4.1 |
| AS4 - 12,000 | 2: PVDF-AA copolymer (2500 ppm + functional CTA (2500 ppm) | 4.2 |
| AS4 - 12,000 | 3: PVDF + MAA functional Acrylic (MMA = methacrylic acid) in 90:10 weight ratio | 4.8 |
| Toho Tenax HT C702 | Control (commercial unknown sizing) | |

Compounds were made using a brabender mixing bowl that holds 65 grams of compound. The matrix resin was first melted in the mixing bowl at 230 C and 45 rpm (for 1 minute). PVDF homopolymer of approximately 6 kpoise melt viscosity at 100 sec-1 was used for the matrix resin for these experiments unless otherwise mentioned. The pre-weighed amount of carbon fiber (15% by weight) is then added to the bowl and the mixing is continued for another 2 minutes. The material is removed from the mixing bowl manually and 60 grams was placed into a compression mold. The material was compression molded at 230 C in a 3 inch by 5 inch by ⅛ inch positive displacement mold at 230 C in Carver hot press for 1 min at 1000 psi, 2 min at 5000 psi and then 1 min at 10,000 psi. The mold is removed and cooled under pressure at 10,000 psi in a cooling press. Plaques were then cut into 0.5 inch by 5 inch flex bars using a wet, diamond grit tile saw. The bars were dried and conditioned overnight in 50% RH, 73 F controlled temperature lab before testing according to ASTM D790 in an Instron 4201 flexural strength configuration at 0.05 inch per minute. The flex strength is recorded in Table 2.

TABLE 2

| Carbon Fiber | Sized Carbon Fiber Example # (above) | Carbon Fiber Content Wt % | Matrix 6 kpoise PVDF Homopolymer | Flex Strength ASTM D790 (kpsi) |
|---|---|---|---|---|
| AS4-12,000 | 1 | 15 | 85 | 19.0 |
| AS4-12,000 | 2 | 15 | 85 | 17.2 |
| AS4-12,000 | 3 | 15 | 85 | 14.9 |
| Toho Tenax HT C702 | Control | 15 | 85 | 13.2 |

The results are shown in Table 2. Surprisingly in all cases the Flexural Strength of the reinforced PVDF carbon fiber composite is improved by utilizing a functional PVDF sizing.

Twin-Screw Extrusion Test:

Additional sized carbon fiber was created by the same procedure noted above in Example 1 of Table 1. The composite formulation was twin-screw compounded with 15% by weight carbon fiber. A control formulation was also produced with the HT C702 carbon fiber noted above.

Example 5 and another "Control" example were compounded on a 30 mm ZSK twin screw extruder at 230 C with the chopped carbon fiber added using a loss-in-weight side-stuffer to produce 15 wt % chopped carbon fiber in a 6 kpoise viscosity PVDF homopolymer. The extruded strands were pelletized and then injection molded into ASTM D790 flex bars using at 220 C. The flex bars were equilibrated for 24 hrs at 50% RH at 73 F, and then tested for flexural strength as noted above.

The results are found in Table 3 below. These again show the strength enhancement seen with functional PVDF sizing compare to commercially available sizings (Example 5).

TABLE 3

| Example Number | Carbon Fiber 15 Wt % | Matrix (85 wt %) | Flex Strength ASTM D790 (kpsi) |
|---|---|---|---|
| 5 | Example 1 from Table 1 | 6 kpoise PVDF homopolymer | 19.3 |
| Control | Toho Tenax HT C702 | 6 kpoise PVDF homopolymer | 13.2 |

Testing Methodology

The melting point Tm is assigned to the peak temperature of the melting endotherm as measured by DSC. The DSC scan measuring the crystalline content is performed according to ASTM D 451-97 using a Perkin Elmer 7 DSC apparatus with an Intercooler II attachment. The instrument is equipped with a dry box with an N2 purge through the dry box. Specimens of 9 to 10 mg are used and crimped in aluminum pans. The DSC run is performed in a three steps cycle. The cycle is begun at −125° C. followed by a 10° C./min ramp to 210° C. with a 10 minute hold. The sample is then cooled at a rate of 10° C./min to −125° C. and then heated at the 10° C./min rate to 210° C.

Melt viscosity test methodology. The melt viscosity is measured in a Dynisco capillary melt viscometer at 232 C and at an apparent shear rate of 100 sec-1. The die utilized has a XYZ diameter and L/D of XZY. From Bryan Douglas).

Flexural strength testing is conducted using ASTM D790.

What is claimed is:

1. A sized reinforcing fiber comprising:
   a) a reinforcing fiber selected from the group consisting of carbon fiber, aramid fiber, and glass fiber; and
   b) at least one sizing comprising functionalized polymer said polymer selected from the group consisting of:
      i) both a functionalized vinylidene fluoride polymer (PVDF polymer), and a compatible functional non-fluorinated polymer, wherein the functionalized PVDF polymer is a copolymer comprising copolymerized fluoromonomer and functional comonomer or is a functionalized block PVDF polymer having a PVDF polymer block and a low molecular weight functional polymer block, wherein at least one functional group of the compatible functional non-fluorinated polymer is bonded to the reinforcing fiber, and
      ii) a functionalized PVDF copolymer and a compatible functional non-fluorinated polymer, comprising VDF monomer, copolymerized with optional fluorinated comonomer, and at least one functional comonomer, wherein at least one functional group of the PVDF copolymer is adhered to the reinforcing fiber,
   wherein the functionalized PVDF is not grafted with maleic anhydride, wherein the functionalized PVDF is fluorosurfactant free and wherein the fluoromonomers in the PVDF are vinylidene fluoride (VDF), and the optional fluorinated comonomer is selected from the group consisting of, tetrafluoroethylene (TFE), trifluoroethylene (TrFE), chlorotrifluoroethylene (CTFE), hexafluoropropene (HFP), 2,3,3,3-tetrafluoropropene, 3,3,3-trifluoropropene, vinyl fluoride (VF), pentafluoropropene, perfluoromethyl vinyl ether (PMVE), perfluoropropylvinyl ether, hydrophilic monomers containing a fluorine atom and combinations thereof,
   wherein at least one functional group of the compatible functional non-fluorinated polymer is bonded to the reinforcing fiber and wherein the compatible functional non-fluorinated polymer is a functional acrylic copolymer including at least one methacrylic acid monomer and at least one methyl methacrylate monomer.

2. The sized reinforcing fiber of claim 1, wherein the sizing includes a functionalized block PVDF having a PVDF block and a low molecular weight functional polymer block.

3. The sized reinforcing fiber of claim 2, wherein the low molecular weight functional polymer results from a chain transfer agent selected from the group consisting of polyacrylic acid, polylactic acid, polyphosphonic acid, polysulfonic acid, and polymaleic acid; and partially or fully neutralized and/or esterified forms of said acids; and combination thereof.

4. The sized reinforcing fiber of claim 1, wherein said functionalized PVDF comprises a copolymerized functional hydrophilic monomer.

5. The sized reinforcing fiber of claim 1, wherein said sizing comprises a block copolymer having a PVDF block and a functional non-fluoropolymer block.

6. The sized reinforcing fiber of claim 1, wherein the reinforcing fiber is aramid fiber.

7. The sized reinforcing fiber of claim 1, wherein the reinforcing fiber is glass fiber.

8. The sized reinforcing fiber of claim 1, further comprising the compatible functional non-fluorinated polymer, wherein the compatible functional non-fluorinated polymer includes at least one monomer selected from the group consisting of α,β unsaturated carboxylic acids, an acrylic monomer containing a hydroxyl group, a monomer containing an epoxy group, a monomer containing silanols, a monomer containing an aldehyde, an alkenyl cyanide, and acetoacetoxyethyl methacrylate.

9. The sized reinforcing fiber of claim 1, further comprising the compatible functional non-fluorinated polymer, wherein the compatible functional non-fluorinated polymer includes at least one monomer selected from the group consisting of acrylic acid, methacrylic acid, fumaric acid, crotonic acid, itaconic acid, hydroxyethyl methacrylate, hydroxyethyl acrylate, hydroxypropyl acrylate, hydroxypropyl methacrylate, diethylene glycol ethyl ether acrylate, glycidyl acrylate, glycidyl methacrylate, γ-trimethoxysilane methacrylate, γ-triethoxysilane methacrylate, acrolein, acrylonitrile, methacrylonitrile, and acetoacetoxyethyl methacrylate.

10. The sized reinforcing fiber of claim 1, wherein the reinforcing fiber is carbon fiber.

11. A sized reinforcing fiber comprising:
   a) a reinforcing fiber selected from the group consisting of carbon fiber and aramid fiber;
   b) a first sizing polymer containing at least one functional group; and
   c) at least one further sizing comprising functionalized polymer said polymer selected from the group consisting of:

i) a functionalized vinylidene fluoride polymer (PVDF), containing a low molecular weight functional polymer chain transfer agent, and wherein at least one functional group of the functionalized PVDF is bonded to the first sizing polymer;

ii) both a functionalized PVDF polymer and a compatible functional non-fluorinated polymer, wherein at least one functional group of the compatible functional non-fluorinated polymer is bonded to the first sizing polymer; and iii) a functionalized PVDF copolymer comprising VDF monomer, optional fluorinated comonomer, and at least one functional comonomer, wherein at least one functional group of the PVDF copolymer is adhered to the first sizing polymer, wherein the functionalized PVDF is not grafted with maleic anhydride, and wherein the fluoromonomers in the PVDF are selected from the group consisting of vinylidene fluoride (VDF), tetrafluoroethylene (TFE), trifluoroethylene (TrFE), chlorotrifluoroethylene (CTFE), hexafluoropropene (HFP), 2,3,3,3-tetrafluoropropene, 3,3,3-trifluoropropene, vinyl fluoride (VF), pentafluoropropene, perfluoromethyl vinyl ether (PMVE), perfluoropropylvinyl ether and hydrophilic monomers containing a fluorine atom.

12. The sized reinforcing fiber of claim 11, wherein the reinforcing fiber is carbon fiber and the first polymer is compatible with the carbon fiber.

13. The sized reinforcing fiber of claim 11, wherein the low molecular weight functional polymer results from a chain transfer agent selected from the group consisting of polyacrylic acid, polylactic acid, polyphosphonic acid, polysulfonic acid, and polymaleic acid; and partially or fully neutralized and/or esterified forms of said acids; and combination thereof.

14. The sized reinforcing fiber of claim 11, wherein the compatible functional non-fluorinated polymer is a functional acrylic copolymer including at least one methacrylic acid monomer and at least one methyl methacrylate monomer.

15. The sized reinforcing fiber of claim 11, wherein the compatible functional non-fluorinated polymer includes at least one monomer selected from the group consisting of α,β unsaturated carboxylic acids, an acrylic monomer containing a hydroxyl group, a monomer containing an epoxy group, a monomer containing silanols, a monomer containing an aldehyde, an alkenyl cyanide, and acetoacetoxyethyl methacrylate.

16. A method of preparing sized carbon fiber comprising
1) Activating a carbon fiber to form oxygen or amine containing functional groups on the carbon fiber; and
2) Sizing the carbon fiber with a functionalized PVDF containing at least one functional group;
wherein the functionalized PVDF is a copolymer comprising copolymerized fluoromonomer and functional comonomer or is a functionalized block PVDF having a PVDF block and a low molecular weight functional polymer block, and is not grafted with maleic anhydride,
wherein the at least one functional group of the functionalized PVDF reacts with the functional group on the carbon fiber to form a bond with the carbon fiber.

17. A method of preparing sized reinforcing fiber comprising sizing a reinforcing fiber sized with a first polymer, said first polymer containing at least one functional group, with a functionalized PVDF containing at least one functional group, wherein the at least one functionalized group on the functionalized PVDF forms a bond with the at least one functional group of the first polymer.

18. The method of claim 17, wherein the first polymer is compatible with the reinforcing fiber.

19. A sized reinforcing fiber comprising:
a) a reinforcing fiber selected from the group consisting of carbon fiber, aramid fiber, and glass fiber; and
b) at least one sizing comprising functionalized polymer said functionalized polymer comprising
both a functionalized PVDF polymer, and a compatible functional non-fluorinated polymer, wherein the functionalized PVDF polymer is a copolymer comprising copolymerized vinylidene fluoride and functional comonomer or is a functionalized block PVDF having a PVDF block and a low molecular weight functional polymer block,
wherein at least one functional group of the compatible functional non-fluorinated polymer is bonded to the reinforcing fiber, and
wherein at least one functional group of the compatible functional non-fluorinated polymer is bonded to the reinforcing fiber and wherein the compatible functional non-fluorinated polymer is a functional acrylic copolymer including at least one methacrylic acid monomer and at least one methyl methacrylate monomer.

* * * * *